United States Patent [19]
Raab et al.

[11] Patent Number: 4,730,090
[45] Date of Patent: Mar. 8, 1988

[54] ELECTRICAL SWITCH HAVING OPPOSITELY FACING CONTACTOR

[75] Inventors: Andrew F. Raab, Morton Grove; Albert R. Cobb, III, Glenview, both of Ill.

[73] Assignee: Indak Manufacturing Corp., Northbrook, Ill.

[21] Appl. No.: 18,523

[22] Filed: Feb. 25, 1987

Related U.S. Application Data

[62] Division of Ser. No. 800,558, Nov. 21, 1985, Pat. No. 4,679,588.

[51] Int. Cl.⁴ ............................................. H01H 19/58
[52] U.S. Cl. .................................................. 200/11 J
[58] Field of Search ................. 210/11 A, 11 G, 11 J, 210/11 K, 16 C, 61.8 L

[56] References Cited

U.S. PATENT DOCUMENTS

| | | | |
|---|---|---|---|
| 1,934,368 | 11/1933 | Macy | 200/11 A |
| 2,303,693 | 12/1942 | Hill | 200/16 C |
| 3,184,559 | 5/1965 | Oxley | 200/11 J |
| 3,198,896 | 8/1965 | Clavel | 200/16 C |
| 3,248,491 | 4/1966 | Kroll et al. | 200/16 C |
| 3,942,555 | 3/1976 | Raab et al. | 200/61.86 X |
| 4,054,761 | 10/1977 | Raab et al. | 200/61.86 X |
| 4,168,405 | 9/1979 | Raab et al. | 200/16 C |
| 4,251,698 | 2/1981 | Raab et al. | 200/61.86 |
| 4,258,237 | 3/1981 | Beck | 200/11 J |
| 4,448,390 | 5/1984 | Halstead et al. | 200/61.86 X |

*Primary Examiner*—J. R. Scott
*Attorney, Agent, or Firm*—Burmeister, York, Palmatier, Hamby & Jones

[57] ABSTRACT

The switch includes a rotatable electrically insulating carriage having first and second contactors mounted thereon and facing in opposite directions from the path of the carriage, for a sliding engagement with first and second sets of fixed contacts. The contactors are biased in opposite directions, toward the contacts, by an electrically insulating switch assembly, mounted in a cylindrical opening in the carriage, and comprising a cup-shaped insulator having a cylindrical portion slidably mounted in the cylindrical opening. The insulator having a cup-shaped spring nest therein, for receiving one end of a coil spring. Biasing forces are exerted against the contactors by an end portion of the insulator and the opposite end of the coil spring. The cup-shaped insulator guides and locates the coil spring while obviating any electrical connection between the first and second contactors.

2 Claims, 13 Drawing Figures

ELECTRICAL SWITCH HAVING OPPOSITELY FACING CONTACTOR

This application is a division of application Ser. No. 800,558 filed Nov. 21, 1985 now U.S. Pat. No. 4,679,588, issued July 14, 1987.

FIELD OF THE INVENTION

This invention relates to switch construction features of a rotary control device which is a combination rotary electrical switch and vacuum selector valve, all operated by a single rotary shaft. The rotary control device is especially well adapted for controlling automotive heating and air conditioning systems, for use in automobiles, trucks and other vehicles, but the rotary control device will also find other applications.

BACKGROUND OF THE INVENTION

The assignee of the present application is the owner of several U.S. patents relating to prior control devices comprising electrical switches combined with vacuum selector valves, but in such prior devices, the movable operating members for the electrical switches and vacuum control valves have linear movement or lever action, and not rotary movement. Such prior patents include Raab and Cobb U.S. Pat. No. 3,942,555; Raab and Halstead U.S. Pat. No. 4,054,761; Raab U.S. Pat. No. 4,126,153; Raab and Halstead U.S. Pat. No. 4,251,698; Raab and Halstead U.S. Pat. No. 4,291,725; and Halstead and Black U.S. Pat. No. 4,448,390.

The problem has been presented of developing switch construction features which are well-adapted for use in rotary action vacuum-electric control devices, combining electrical switches with vacuum control valves.

SUMMARY OF THE INVENTION

One object of the present invention is to provide a rotary electrical switch, comprising an electrically insulating casing, a rotary carriage having a shaft rotatable in the casing, the carriage being made of an electrically insulating material, the casing having a bearing for rotatably supporting the shaft along a rotary axis, the rotary carriage having first and second opposite sides facing in opposite directions which are generally parallel with the rotary axis, first and second electrically conductive contactors mounted on the first and second sides of the rotary carriage and facing in the opposite directions, first electrically conductive contact means confronting the first contactor and slidably engageable by the first contactor for selectively establishing electrical connections between the first contactor and the first contact means, second electrically conductive contact means confronting the second contactor and slidably engageable by the second contactor for selectively establishing electrical connections between the second contactor and the second contact means, the casing comprising front and rear electrically insulating components and connecting means for connecting the front and rear components together, the first contact means being mounted on one of the components, the second contact means being mounted on the other of the components, the carriage having a cylindrical opening therein disposed between the first and second contactors, and electrically insulating spring means mounted in the cylindrical opening and acting between the first and second contactors for biasing the first contactor toward the first contact means while biasing the second contactor toward the second contact means, the electrically insulating spring means including a cup-shaped insulator having a cylindrical portion slidably mounted in the cylindrical opening, the insulator having an end wall portion engaging the first contactor, the cup-shaped insulator having a cup-shaped spring nest therein, and a coil spring having first and second opposite ends, the first end of the coil spring being received and located in the spring nest in the insulator, the second end of the coil spring engaging the second contactor, whereby the cup-shaped insulator presses the first contactor toward the first contact means while the second end of the coil spring presses the second contactor toward the second contact means, the cup-shaped insulator guiding and locating the coil spring while obviating any electrical connection between the first and second contactors.

Preferably, the first and second contactors are in the form of first and second contactor plates, while the first and second contact means comprise first and second groups of contact elements which are slidably engageable by the first and second contactor plates, for selectively establishing bridging electrical connections between the respective first and second contactor plates and the contact elements of the first and second groups.

BRIEF DESCRIPTION OF THE DRAWINGS

Further objects, adavantages and features of the present invention will appear from the following description, taken with the accompanying drawings, in which.

DETAILED DESCRIPTION OF AN ILLUSTRATIVE EMBODIMENT

Figure 2:
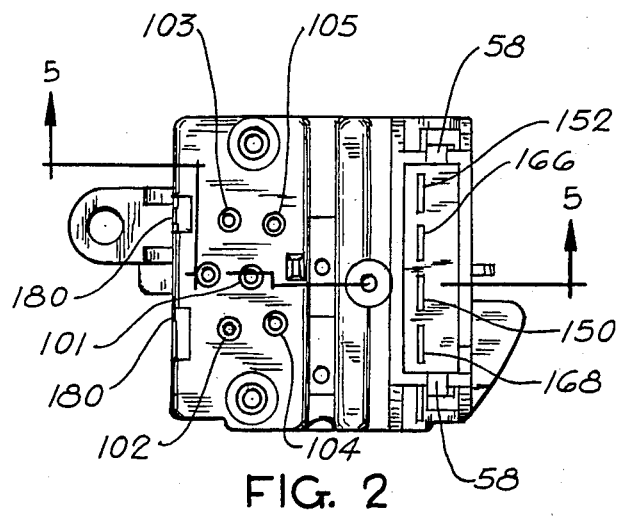
FIG. 2 is a rear elevation of the control device.
Figure 1:
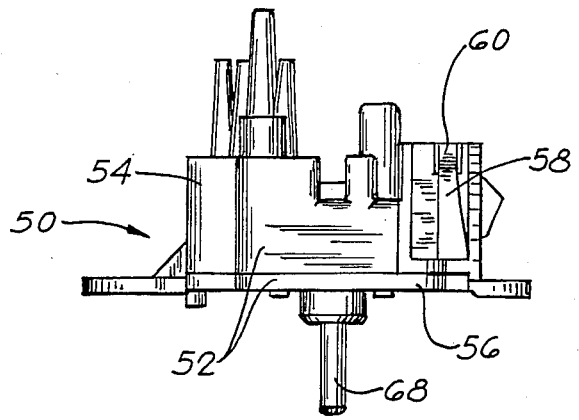
FIG. 1 is a plan view of a rotary control device, constituting a combination rotary electrical switch and vacuum selector valve, to be described as an illustrative embodiment of the present invention.
Figure 4:
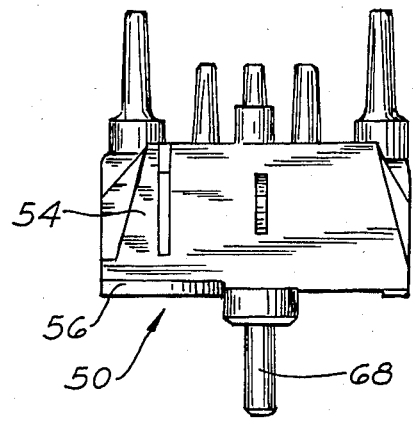
FIG. 4 is a side elevation.
Figure 3:
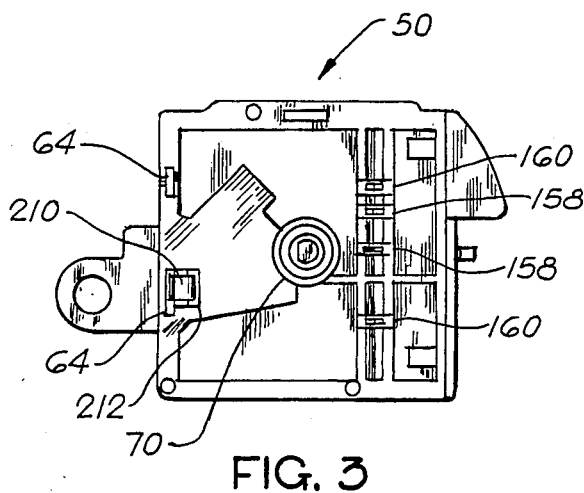
FIG. 3 is a front elevation.
Figure 5:
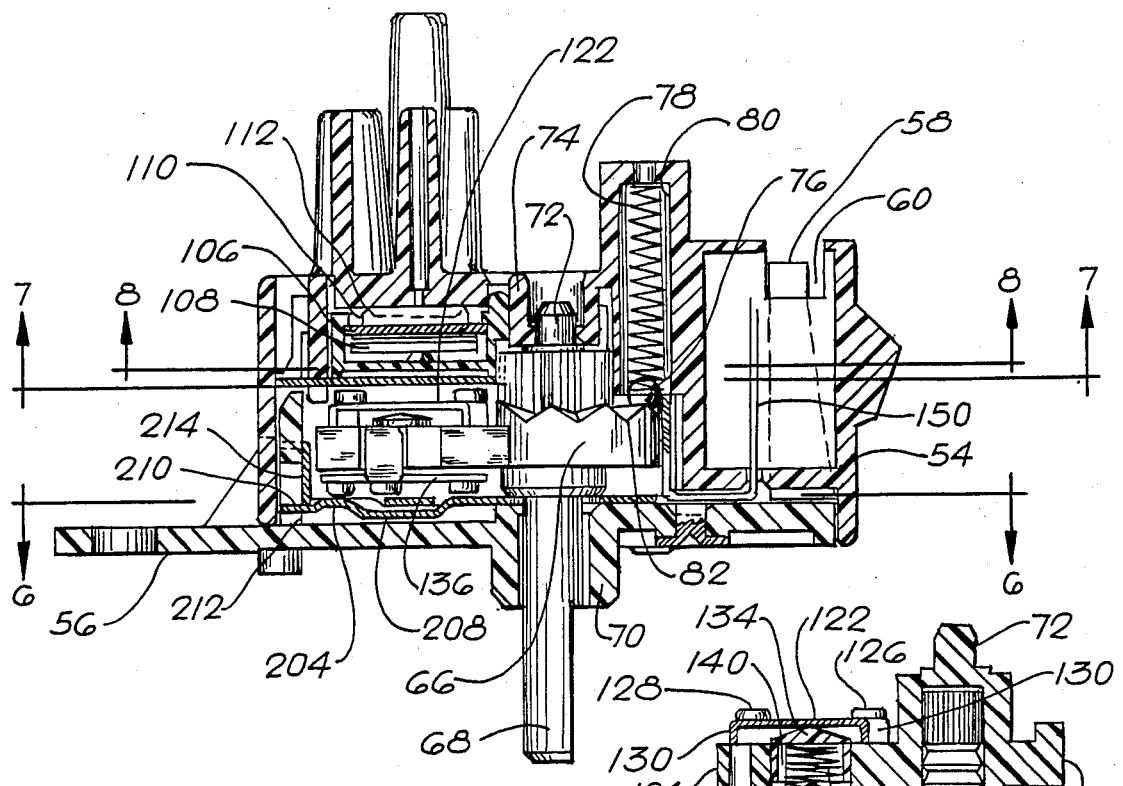
FIG. 5 is an enlarged section, taken generally along the line 5—5 in FIG. 2.
Figure 5A:
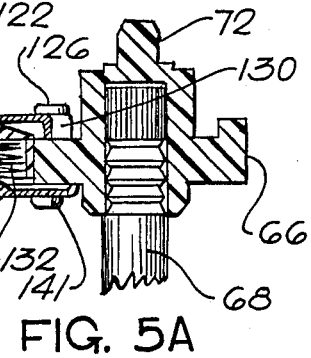
FIG. 5A is a fragmentary section, similar to a portion of FIG. 5, but showing the rotary carriage in section.
Figure 6:
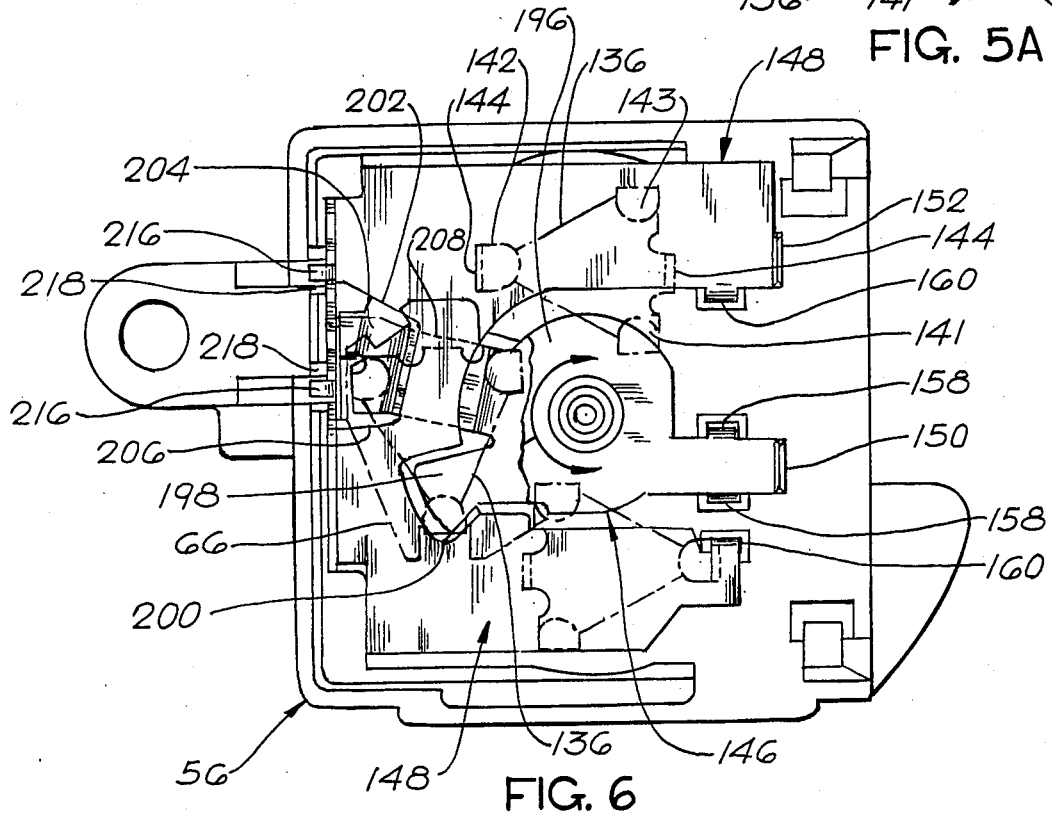
FIG. 6 is an enlarged elevation, taken as indicated by the line 6—6 in FIG. 5, and showing the front casing component, disassembled from the switch, with the front contact plates mounted on the front casing component, and with the front contactor shown in phantom.
Figure 7:
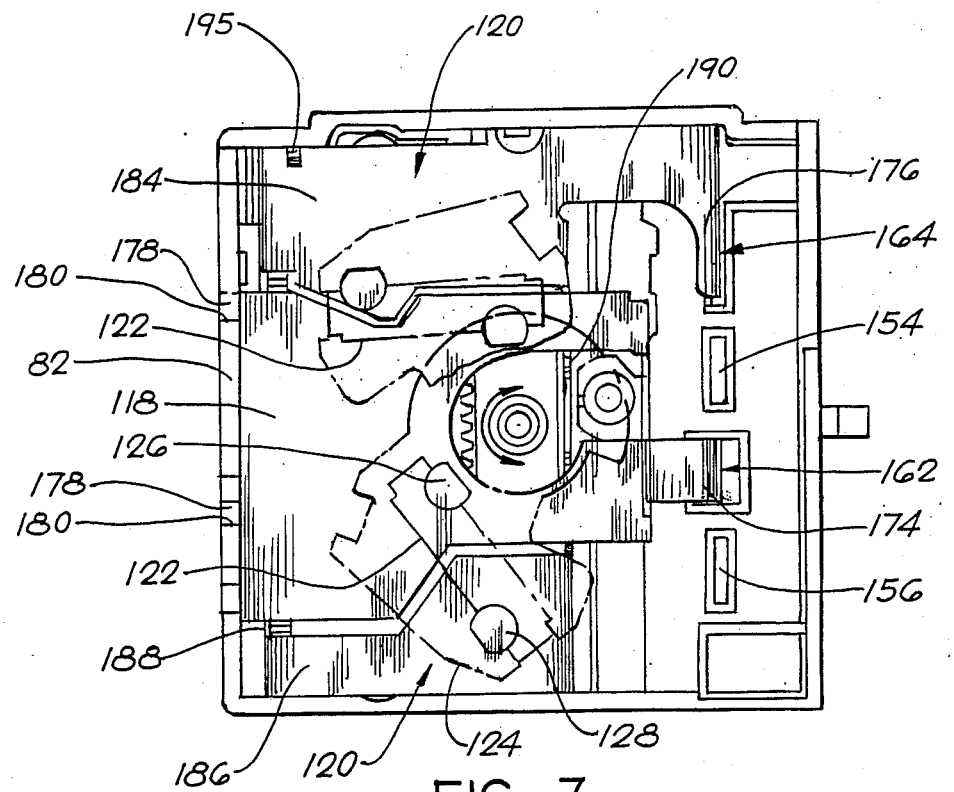
FIG. 7 is an elevation, taken generally as indicated by the line 7—7 in FIG. 5, and showing the rear casing component, disassembled from the device, with the rear contact plates and the valve carriage in place on the rear component, and with the rear contactor and the rotary carriage shown in phantom.
Figure 8:
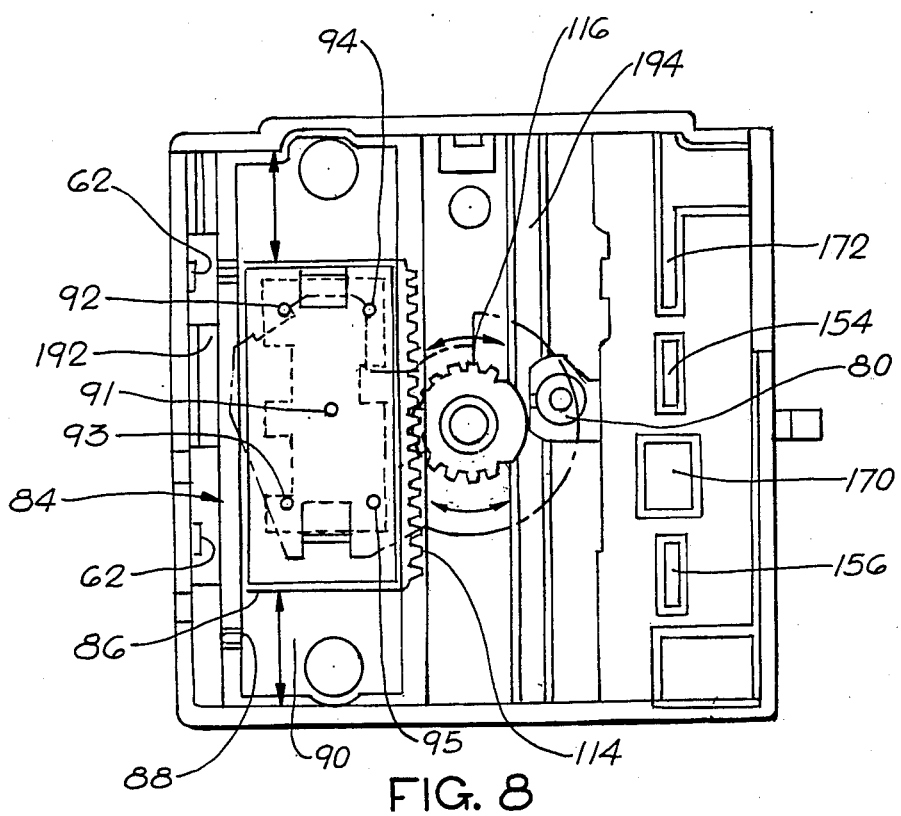
FIG. 8 is an elevation, taken generally as indicated by the line 8—8 in FIG. 5, and showing the rear casing component with the valve carriage in place, but with the rear contact plates removed.
Figure 10:
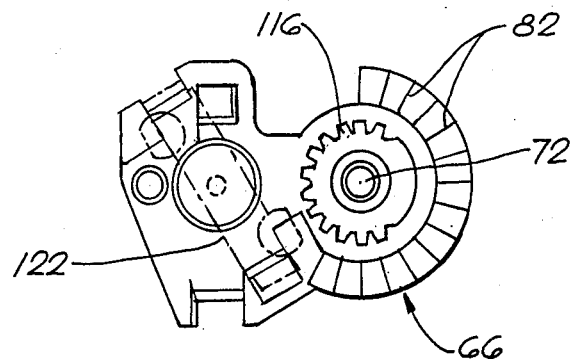
FIG. 10 is a rear elevation of the rotary carriage, with the rear contactor shown in phantom.
Figure 9:
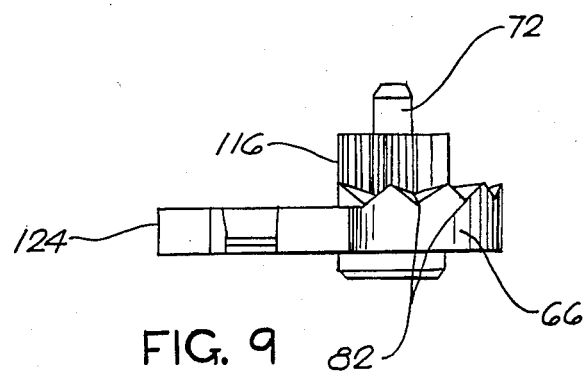
FIG. 9 is a plan view of the rotary carriage.
Figure 11:
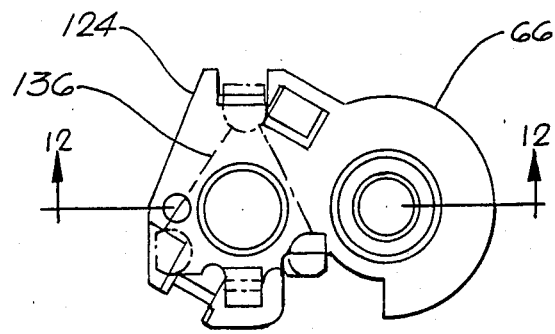
FIG. 11 is a front elevation of the rotary carriage, with the front contactor shown in phantom.
Figure 12:
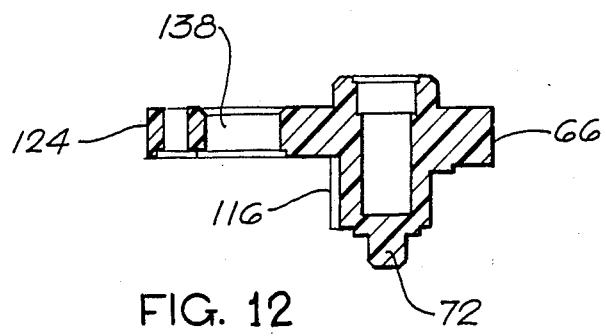
FIG. 12 is a section through the rotary carriage, taken generally along the line 12—12 in FIG. 11.

As just indicated, the drawings illustrate a rotary control device 50 constituting a combined rotary electrical switch and vacuum selector valve. The rotary control device 50 has a casing 52, preferably made of a suitable resinous plastic material which is capable of being intricately molded, and which is strong and resilient to afford good mechanical properties. The plastic material also affords electrical insulation and should be resistant to heat.

The casing 52 is hollow, to house the other components of the control device 50. As shown, the casing 52 comprises rear and front components 54 and 56, with connecting means for connecting the components together. In general, the rear component 54 is constructed like a hollow box-like body, while the front component 56 is constructed like a front cover for the rear component 54. The two components 54 and 56 slide together during the assembly of the control device 50. The rear and front components 54 and 56 preferably have latching means for connecting the components together. Such latching means may include a pair of latching fingers 58, projecting rearwardly on the front component 56 and adapted to snap into latching slots 60 on the rear component 54. The latching means also may comprise latching teeth 62 on the rear component 54, adapted to snap into latching slots 64 on the front component 56.

The rotary control device 50 also comprises rotary carriage means having rotary shaft means, such rotary carriage means comprising a rotary carriage 66, rotatable within the casing 52, and fitted with a rotary operating shaft 68, which extends out of the casing 52 through a front bearing 70, formed on the front casing component 56. The rotary carriage 66 is preferably made of a suitable resinous plastic material which provides electrical insulation and is intricately moldable. The illustrated shaft 68 is made of metal and is pressed into or otherwise secured to the rotary carriage 66. The rotary carriage 66 includes a rearwardly projecting stub shaft 72 which is rotatably supported by a rear bearing 74 on the rear casing component 54.

In this instance, the rotary carriage 66 and the rotary operating shaft 68 are rotatable through a range of approximately one hundred eighty degrees. The rotary carriage 66 is resiliently detained in a series of control positions within this range, by detent means, preferably comprising a detent ball 76, biased against the rotary carriage 66 by a coil spring 78. A nest 80 is formed in the rear casing component 54 to receive the detent ball 76 and the coil spring 78. The detent ball 76 is engageable with a series of detent notches 82 in the rotary carriage 66.

The rotary control device 50 has vacuum selector valve means 84, supported by the rear casing component 54 and operable by the rotary carriage 66. Such vacuum selector valve means may comprise a valve carriage 86 which is movable along a linear path in a linear guide channel 88, formed in the rear component 54. The rear wall portion of the guide channel 88 affords a flat, linear valve surface 90 which is perforated to form an array of valve ports, extending rearwardly out of the rear casing component 54. In this instance, there are five valve ports 91, 92, 93, 94 and 95, connecting with five rearwardly projecting nipples 101, 102, 103, 104 and 105 on the rear casing component 54. The nipples 101–105 are adapted to receive a conventional vacuum connector device, not shown.

The valve carriage 86 is constructed like a rearwardly opening box or tray and is adapted to receive a valve member 106 and a leaf spring 108 which biases the valve member 106 against the valve surface 90, for sliding movement along the valve surface. The valve member 106 has a rubber-like rear component 110, made of a soft, resilient material, such as silicone rubber or the like, and formed with a complex maze-like ridge 112 which slides along the valve surface 90 and selectively interconnects the various valve ports 91–95 at various positions of the valve member 106.

The rotary control device 50 is provided with driving means, whereby rotation of the rotary carriage 66 produces linear movement of the valve carriage 86. Thus, a gear rack 114 is formed on the valve carriage 86 and is in meshing engagement with a pinion gear 116, formed as part of the rotary carriage 66. When the rotary carriage 66 is rotated through approximately one hundred eighty degrees, the pinion gear 116 drives the gear rack 114 and causes linear movement of the valve carriage 86 along the length of the guide channel 88.

The rotary control device 50 also comprises first and second electrical switching means, operable by rotation of the rotary carriage 66. The first switching means may comprise first switch contact plates 118 and 120, mounted on the rear casing component 54. Portions of the switch contact plates 118 and 120 also slidably engage the front surface of the valve carriage 86, for retaining the valve carriage in the linear guide channel 88. The sliding engagement between the valve carriage 86 and the switch contact plates 118 and 120 is such as to maintain the valve carriage 86 along a linear path, such that the leaf spring 108 is partially compressed, so that the valve member 106 is biased against the valve surface 90.

The first switch contact plates 118 and 120 face forwardly and are slidably engageable by a first electrical contactor 122, mounted on the rotary carriage 66, which has an arm 124 for supporting the contactor 122. It will be seen that the contactor 122 is in the form of an electrically conductive bridging plate having two rearwardly projecting protuberances or contactor points 126 and 128, for slidably engaging the contact plates 118 and 120, to connect the contact plates together electrically, in various positions of the rotary carriage 66. The contactor 122 is positioned on the rear side of the supporting arm 124 and is formed with a pair of retaining tabs or prongs 130 which are slidably retained on the arm 124, so that the contactor 122 can be resiliently biased toward the contact plates 118 and 120.

The resilient biasing action is provided by spring means, illustrated as comprising a coil spring 132, fitted with an insulating member 134, so that the coil spring can also serve as the biasing means for a second switch contactor 136, mounted on the front side of the supporting arm 124. The coil spring 132 extends through an opening 138 in the supporting arm 124. Such opening 138 locates the coil spring 132 in the proper position on the supporting arm 124. The insulating member 134 is cup-shaped, so as to provide a nest 140 therein, for receiving one end of the coil spring 132. The insulating member 134 may be made of a suitable resinous plastic material.

The second switch contactor 136 is in the form of an electrically conductive bridging plate having three forwardly projecting protuberances or contactor points 141, 142 and 143, for slidably engaging second switch contact means, mounted on the front casing component 56. The second switch contactor 136 has a pair of rearwardly projecting tabs or prongs 144 which are slidably retained on the supporting arm 124.

As shown, the second contact means comprise second contact plates 146 and 148, mounted on the front casing component 56. The contact plates 146 and 148 are slidably engageable by the second contactor points 141–143, for selectively connecting the plates together electrically, in various positions of the rotary carriage 66.

The second or front contact plates 146 and 148 are provided with respective rearwardly projecting terminals 150 and 152 which project outside of the rear casing component 54, through slots 154 and 156 therein. In the general neighborhood of the terminals 150 and 152, the contact plates 146 and 148 have pairs of staking tabs 158 and 160 which extend through slots in the front casing component 56 and are staked in place.

The first or rear contact plates 118 and 120 are formed with U-shaped terminal members 162 and 164, including end portions or terminals 166 and 168 which project rearwardly outside the rear casing member 54, through slots 170 and 172 therein. The four terminals 140, 142, 166 and 168 are adapted to receive an electrical connector plug, not shown. The U-shaped terminal members 162 and 164 have intermediate portions 174 and 176 which are retained between the rear and front casing components 54 and 56, when they are fully assembled.

The rear contact plate 118 is provided with tabs 178 which interlock with slots 180 in one side wall 182 of the rear casing component 54. The interlocking tabs 178 and slots 180 insure that the contact plate 118 is held in a stable position, so that the contact plate 118 properly functions as a retainer for the slidable valve carriage 86, which slidably engages the rear side of the contact plate 118.

The other rear contact plate 120 has two plate portions 184 and 186, connected together by two flanges 188 and 190 which are recessed into grooves 192 and 194 in the rear casing component 54. In this way, the contact plate 120 is accurately located on the rear component 54. The plate 120 is formed with a forwardly struck projection 195 which is retained between the rear and front casing components 54 and 56.

The first or rear switching means, comprising the rear contact plates 118 and 120 and the rear contactor 122, may be employed very advantageously to control the energization of the air conditioning clutch in an automotive heating and air conditioning system. The clutch is energized in those positions of the contactor 122 in which the contactor bridges between the first contact plate 118 and the two separated portions 184 and 186 of the second contact plate 120. In other positions of the contactor 122, when the contactor does not bridge between the contact plates 118 and 120, the air conditioning clutch is not energized.

The second or front switching means, comprising the second contactor 136 and the second contact plates 146 and 148, may be employed very advantageously to control the electrical energization of the blower motor for the automotive heating and air conditioning system. When the contactor 136 bridges between the contact plates 146 and 148, the blower motor is energized.

It is very advantageous to employ the same coil spring 132 for biasing both contactors 122 and 136. The insulating member 134, which is interposed between the spring 132 and one of the contactors, prevents the spring from establishing an electrical connection between the two contactors.

As shown, the front contact plate 146 has an inner, circular portion 196 which is engaged at all times by the innermost contactor point 141. The contact plate 146 has a first radial arm 198 which is engaged in one position of the contactor 36 by the second contactor point 142. In other positions of the contactor 136, the contactor point 142 engages the larger contact plate 148. A notch 200 is formed in the larger contact plate 148 to afford clearance for the first radial arm 198 of the contact plate 146.

The smaller contact plate 146 also has a second radial arm 202, with an outer contact portion 204 which is engaged by the third or outermost contactor point 143, in one position of the contactor 136. The larger contact plate 148 is formed with a notch 206, in its outer portion, affording clearance for the outer contact portion 204. The second radial arm 202 has an intermediate portion 208 which is offset forwardly and is recessed into the front casing component 56, to avoid any electrical contact between the intermediate portion 208 and the larger contact plate 148. The extreme outer end of the second radial arm 202 takes the form of a forwardly offset tab 210 which interlocks with a slot 212, formed in the front casing component 56. In this way, the arm 202 is accurately located and is securely held against any possible electrical contact with the larger contact plate 148.

As shown, the larger contact plate 148 is formed with a rearwardly projecting flange 214 having outwardly projecting tabs 216, extending into locating slots 218 in the front casing component 56. The flange 214 is notched out to avoid any possible electrical contact with the contact portion 204 of the arm 202.

In one position of the second contactor 136, all three contactor points 141, 142 and 143 engage portions of the smaller contact plate 146, to provide an "OFF" position. The innermost contact point 141 engages the inner circular portion 196 of the plate 146. The second contactor point 142 engages the radial arm 198. The outermost contactor point 143 engages the contact portion 204 of the second radial arm 202. When the contactor 136 is moved in either direction of rotation from this "OFF" position, the contactor points 142 and 143 engage the larger contact plate 148, so that the contactor 136 bridges between the contact plates 146 and 148. With this construction, the contactor points 142 and 143 provide dual simultaneous breaking of the electrical circuit, so that the wear on the contactor points and the contact plates, due to arcing, is spread between the two break zones, In this way, the life of the switch is substantially prolonged.

The rotary control device 50 is extremely compact, despite the fact that it incorporates a vacuum selector valve and two rotary electrical switches. All of the functions are controlled by the rotation of a single shaft.

We claim:

1. A rotary electrical switch, comprising an electrically insulating casing,
a rotary carriage having a shaft rotatably in the casing,
the carriage being made of an electrically insulating material,
the casing having a bearing for rotatably supporting the shaft along a rotary axis, the rotary carriage having first and second opposite sides facing in opposite directions which are generally parallel with the rotary axis, first and second electrically conductive contactors mounted on the first and second sides of the rotary carriage and facing in the opposite directions, first electrically conductive contact means confronting the first contactor and slidably engageable by the first contactor for selectively establishing electrical connections between the first contactor and the first contact means, second electrically conductive contact means confronting the second contactor and slidably engageable by the second contactor for selectively establishing electrical connections between the second contactor and the second contact means, the casing comprising front and rear electrically insulating components and connecting means for connecting the front and rear components together, the first contact means being mounted on one of the components, the second contact means being mounted on the other of the components, the carriage having a cylindrical opening therein disposed between the first and second contactors, and electrically insulating spring means mounted in the cylindrical opening and acting between the first and second contactors for biasing the first contactor toward the first contact means while biasing the second contactor toward the second contact means, the electrically insulating spring means including a cup-shaped insulator having a cylindrical portion slidably mounted in the cylindrical opening, the insulator having an end wall portion engaging the first contactor, the cup-shaped insulator having a cup-shaped spring nest therein, and a coil spring having first and second opposite ends, the first end of the coil spring being received and located in the spring nest in the insulator, the second end of the coil spring engaging the second contactor, whereby the cup-shaped insulator presses the first contactor toward the first contact means while the second end of the coil spring presses the second contactor toward the second contact means, the cup-shaped insulator guiding and locating the coil spring while obviating any electrical connection between the first and second contactors.

2. A rotary electrical switch, comprising
an electrically insulating casing,
a rotary carriage having a shaft rotatable in the casing,
the carriage being made of an electrically insulating material,
the casing having a bearing for rotatably supporting the shaft along a rotary axis, the rotary carriage having first and second opposite sides facing in opposite directions which are generally parallel with the rotary axis, first and second electrically conductive contactor plates mounted on the first and second sides of the rotary carriage and facing in the opposite directions, first electrically conductive contact means including a plurality of first contact elements confronting the first contactor plate and slidably engageable by the first contactor plate for selectively establishing bridging electrical connections between the first contactor plate and the first contact elements, second electrically conductive contact means including a plurality of second contact elements confronting the second contactor plate and slidably engageable by the second contactor plate for selectively establishing bridging electrical connections between the second contactor plate and the second contact elements, the casing comprising front and rear electrically insulating components and connecting means for connecting the front and rear components together, the first contact means being mounted on one of the components, the second contact means being mounted on the other of the components, the carriage having a cylindrical opening therein disposed between the first and second contactor plates, and electrically insulating spring means mounted in the cylindrical opening and acting between the first and second contactor plates for biasing the first contactors plate toward the first contact means while biasing the second contactor plate toward the second contact means, the electrically insulating spring means including a cup-shaped insulator having a cylindrical portion slidably mounted in the cylindrical opening, the insulator having an end wall portion engaging the first contactor plate, the cup-shaped insulator having a cup-shaped spring nest therein, and a coil spring having a first and second opposite ends, the first end of the coil spring being received and located in the spring nest in the insulator, the second end of the coil spring engaging the second contactor plate, whereby the cup-shaped insulator presses the first contactor plate toward the first contact means while the second end of the coil spring presses the second contactor plate toward the second contact means, the cup-shaped insulator guiding and locating the coil spring while obviating any electrical connection between the first and second contactor plates.

* * * * *